Patented Jan. 10, 1933

1,893,599

UNITED STATES PATENT OFFICE

ALMERIC WALTER SEYMOUR, OF LOS ANGELES, CALIFORNIA

PROTECTIVE COATING

No Drawing.    Application filed May 23, 1930.  Serial No. 455,153.

In this specification I shall describe and show a preferred form of my invention and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to methods for protecting materials that are exposed to the elements, against rust, corrosion, or chemical disintegration of any kind, to which they would otherwise be subjected. Among its principal objects are: first, to provide a practical protective coating that is adapted for application to a great variety of structures and structural material; second, to produce a coating for such purposes that is not in itself subject to deterioration throughout long periods of time; third, to supply a coating of this kind that has great adhesive qualities, that is elastic in nature, and that is capable of accommodating itself to expansion or contraction of the surfaces to which it is applied; fourth, to produce a new coating for the foregoing purposes, that is not substantially affected by temperature changes within the range of those ordinarily encountered by the materials and structures to which it is applicable; and fifth, to accomplish all of said objects in a coating that is capable of application in a very simple and convenient manner.

It is well known in the art that bituminous materials afford ideal protection, so long as they can be made to adhere to the surfaces to which they are applied, and so long as they themselves are not destroyed or changed in character. In the use of such materials the practical difficulties encountered have been largely due to their inability to maintain adhesion to the surfaces to which they are applied; and to changes in their physical characteristics caused by the action of the elements to which they are exposed. These changes may be due to evaporation of the volatile components, or to oxidation; and they result in causing the protective substance of the coating to harden, crack, chip, or peel away from the surfaces to which it is applied. These effects are particularly noticeable when the structures are subjected to mechanical stresses, or vibration. When such changes of character occur, the protective quality of the coating has disappeared.

In other cases, certain constituents of the coating are slightly soluble, and gradually disappear for this reason.

A third class of coating material that has been used, is more or less hygroscopic, and capable of absorbing moisture. Such absorption of moisture may change the physical characteristics of the coating in the manner described above, by eliminating certain of its constituents, or may allow moisture to penetrate the coating, and thus destroy its ability to protect the structure to which it is applied.

A common practice for the protection of surfaces against corrosion consists of coating them with cold bituminous material, ordinarily known as "cut back", followed by one or more coats of the same material, or one or more coats of hot bituminous material. Such coatings gradually harden as a result of oxidation or volatilization, and they then chip or peel away from the surfaces to which they have been applied. Another system that has been used consists in covering the surface to be protected with one or more coats of bituminous emulsion. Such coatings do not fail through lack of adhesion to the surfaces to which they are applied, but they gradually absorb moisture or become porous. This allows corrosion or other disintegration of the underlying surfaces.

The different forms of bituminous emulsions that have been used include what are commonly known as clay emulsions, soap emulsions, emulsions that are made with the aid of peptizing agents, and emulsions that have been made by mechanical subdivision and agitation, or in colloid mills. The bituminous material hitherto used comprises either asphalt, gilsonite, coal tar, or a combination of these materials. All of these have different physical and mechanical characteristics.

I have discovered that a practically ideal protective coating for a large variety of structures may be made by combining the desirable characteristics of the above materials in a particular manner that I will now describe.

In a general way, it may be said that my protective process consists in applying to the surface to be protected, any suitable bituminous emulsion, as an under-coating for any suitable bituminous outer-coating that is impervious and capable of keeping the emulsion in its original condition. Bituminous emulsions are very strongly adherent to surfaces to which they are applied; and I have found that they may be protected against gradual deterioration, or changes of a physical or chemical nature, by a bituminous outer-coating. The latter coating should be of a character to remain yielding or elastic, and be impervious, non-hygroscopic, and chemically inert to the elements that may come in contact therewith. It should also be sufficiently tough, and resistant to such abrasion or cutting as might occur in service. Almost any of the common bituminous emulsions may be used for the under-coating. For the outer-coating either asphalt, gilsonite, coal tar, or combinations of these materials, may be employed.

In the practical application of my invention, I first coat the surface that is to be protected with an under-coating of bituminous emulsion in any convenient manner, as by brushing, spraying, or dipping. If desired, a fabric may then be applied over this emulsion, but for many purposes this is not necessary. I finally apply an outer-coating of asphalt, gilsonite, coal tar, or a combination of these, either hot or cold, by spraying, dipping, or by brush.

I have discovered that, although the melting point of the material of the hot bituminous outer-coating that I employ may be only slightly different from the temperature that would cause the emulsion under-coating to run, the outer-coating may nevertheless be applied hot over the under-coating. This appears to be for the reason that the thermal conductivity of such materials is relatively low, and because the radiating surface is relatively large. Thus, when a hot outer-coating is applied over the emulsion, although its temperature might be sufficient to cause the latter to run if maintained sufficiently long, in practical application this does not occur. The outer-coating cools off and sets sufficiently quickly to prevent the under-coating from running or becoming displaced to an appreciable or deleterious degree. The finished product combines the exceedingly strong adhesive qualities of bituminous emulsions, combined with the impervious, non-hygroscopic, insoluble, elastic, and tough character of the materials used for the outer-coating. The interlayer of fabric, when employed, adds mechanical strength tending to further resist cutting and abrasion.

The protective coating that I have just described possesses many advantages over those previously known in the art. For instance, it is a matter of common knowledge that neither an ordinary "cut-back" bituminous coating, nor a hot bituminous coating, may be applied satisfactorily over a wet surface. To obtain even approximately satisfactory results in the use of such materials, the surfaces to which they are to be applied must be absolutely dry. If there is to be more than one coat, each must be dry before the next one is put on. If any moisture is present the result is immediately apparent. Neither hot or cold non-emulsified bituminous coatings can possibly bond to a wet surface, for the simple reason that water will not amalgamate with them. If any moisture is present, and the coating is applied thereover, there is no way for the moisture to escape. It simply becomes sealed in, with the result that the dried coating may be stripped away from the surface without effort.

On the other hand, a bituminous emulsion acts very differently. It makes no difference whether the surface to which it is applied is dry or not. It will bond perfectly in either case. The reason obviously is that the emulsion itself consists of bituminous materials held in suspension by water. Therefore such moisture as is present on the surface to which it is to be applied will amalgamate perfectly. All the water, whether originally in the emulsion or on the surface to which it is applied, will eventually disappear by surface evaporation aided by capillarity. The remaining bituminous material will coalesce to form a perfectly homogeneous and non-porous film, strongly adherent to the entire surface to which it has been applied, and covering it completely. No time or labor need be expended in drying surfaces that are to be coated with a bituminous emulsion.

Another very marked difference that exists between bituminous emulsions and a bituminous "cut-backs", when used as under-coatings, is the relative thickness of film that may be secured. A bituminous emulsion may be applied very much heavier, and will give a much thicker coating than it is possible to obtain by means of a "cut-back". This is readily apparent because of the much greater tendency of "cut-backs" to run or seep, when an attempt is made to apply them too thick. Emulsions have very little tendency to run. The only way that the same thickness of film can be secured in the use of "cut-backs" is to apply a number of coats, with sufficient intervals between them to allow the previous coat to dry. Obviously this will greatly increase both the time and labor cost required for the job.

A further difference between bituminous emulsions and "cut-backs", becomes very marked as time progresses. An emulsion film always remains elastic and ductile. The "cut-back" film gradually becomes more and more brittle, its adhesive qualities progressively disappear, and finally it can no longer maintain a bond to the surface to which it has been applied.

An emulsion film, by itself, is not sufficiently hard or tough to withstand the abrasion or cutting to which it would be exposed when in service as a protective coating. It is for this reason that I apply the above described bituminous coating thereover. In other words, the emulsion film protects the surfaces to which it is applied, and the outer-coating protects the emulsion film. Both coatings co-act to secure the desired result, and such result is impossible of attainment with either alone.

It will be found that my protective-coating, applied as described, will afford protection to the underlying surfaces indefinitely. It will never become brittle, is completely waterproof, is not affected by acids, brine, alcohol, or corrosive fumes, nor by mechanical shocks or stresses. Its outer portions form a permanent moisture-resisting film, and its inner portions make an exceedingly firm and permanent bond with the surface to which they are applied.

Having thus fully described my invention, I claim:

1. The method of coating materials which comprises; first applying to the surface of a material, a bituminous under-coating of colloidal nature; and then applying a bituminous outer-coating of non-colloidal nature, over the under-coating; the material of the outer-coating being wholly bituminous normally non-fluid, and having been made fluid by heating before its application.

2. The method of coating materials which comprises; first applying to the surface of a material, a bituminous emulsion that is adapted to amalgamate with water; and then applying a bituminous outer-coating of non-colloidal nature, over the emulsion coating; the material of the outer coating being wholly bituminous, normally non-fluid, and having been made fluid by heating before its application.

3. The method of coating materials which comprises; first applying to the surface of a material, an aqueous bituminous emulsion; and then applying a bituminous outer-coating of non-colloidal nature, over the emulsion coating; the material of the outer-coating being wholly bituminous, normally non-fluid, and having been made fluid by heating before its application.

4. The method of coating materials which comprises: first, applying to the surface of a material, an aqueous bituminous emulsion; second, applying a layer of permeable fabric over said emulsion; and then applying a bituminous outer-coating of non-colloidal nature, over the fabric layer; the material of the outer-coating being wholly bituminous, normally non-fluid, and having been made fluid by heating before its application.

ALMERIC WALTER SEYMOUR.